United States Patent
Boffa et al.

(10) Patent No.: US 10,989,628 B2
(45) Date of Patent: Apr. 27, 2021

(54) METHOD AND LINE FOR CHECKING TYRES FOR VEHICLE WHEELS

(71) Applicant: PIRELLI TYRE S.P.A., Milan (IT)

(72) Inventors: Vincenzo Boffa, Milan (IT); Marco Cantù, Milan (IT); Fabio Regoli, Milan (IT); Valeriano Ballardini, Milan (IT)

(73) Assignee: PIRELLI TYRE S.P.A., Milan (IT)

(*) Notice: Subject to any disclaimer, the term of this patent is extended or adjusted under 35 U.S.C. 154(b) by 0 days.

(21) Appl. No.: 16/300,464

(22) PCT Filed: May 17, 2017

(86) PCT No.: PCT/IB2017/052894
§ 371 (c)(1),
(2) Date: Nov. 9, 2018

(87) PCT Pub. No.: WO2017/199173
PCT Pub. Date: Nov. 23, 2017

(65) Prior Publication Data
US 2019/0145862 A1     May 16, 2019

(30) Foreign Application Priority Data
May 18, 2016 (IT) .......................... UA2016A003534

(51) Int. Cl.
*G01M 17/02* (2006.01)
*G01N 21/952* (2006.01)
(Continued)

(52) U.S. Cl.
CPC ......... *G01M 17/027* (2013.01); *G01B 11/245* (2013.01); *G01B 11/2522* (2013.01);
(Continued)

(58) Field of Classification Search
CPC ............ G01M 17/027; G01M 11/081; G01M 17/013; G01M 17/025; G01M 17/007;
(Continued)

(56) References Cited

U.S. PATENT DOCUMENTS

| 6,674,531 B2 | 1/2004 | Mahner |
| 7,177,740 B1 | 2/2007 | Guangjun et al. |

(Continued)

FOREIGN PATENT DOCUMENTS

| CN | 2881697 Y | 3/2007 |
| DE | 102013010402 A1 | 12/2014 |

(Continued)

OTHER PUBLICATIONS

International Search Report and Written Opinion for PCT/IB2017/052894 filed May 17, 2017 on behalf of Pirelli Tyre S.P.A. dated Sep. 6, 2017. 9 pages.

(Continued)

*Primary Examiner* — Dave Czekaj
*Assistant Examiner* — Kehinde Abimbola
(74) *Attorney, Agent, or Firm* — Steinfl + Bruno LLP

(57) ABSTRACT

A checking method and line for checking a tyre for vehicle wheels. The tyre is associated with a model associated with a setting for image acquisition devices. Once the model is obtained, preliminary images of the tyre are acquired, from which at least one adjustment value representative of at least one geometric characteristic of the tyre is obtained. A deviation between the at least one adjustment value and a respective reference value associated with the model is then calculated. The setting associated with the model of tyre is then adjusted based on the calculated deviation and the tyre is then inspected to look for possible production defects by (Continued)

Figure 1:
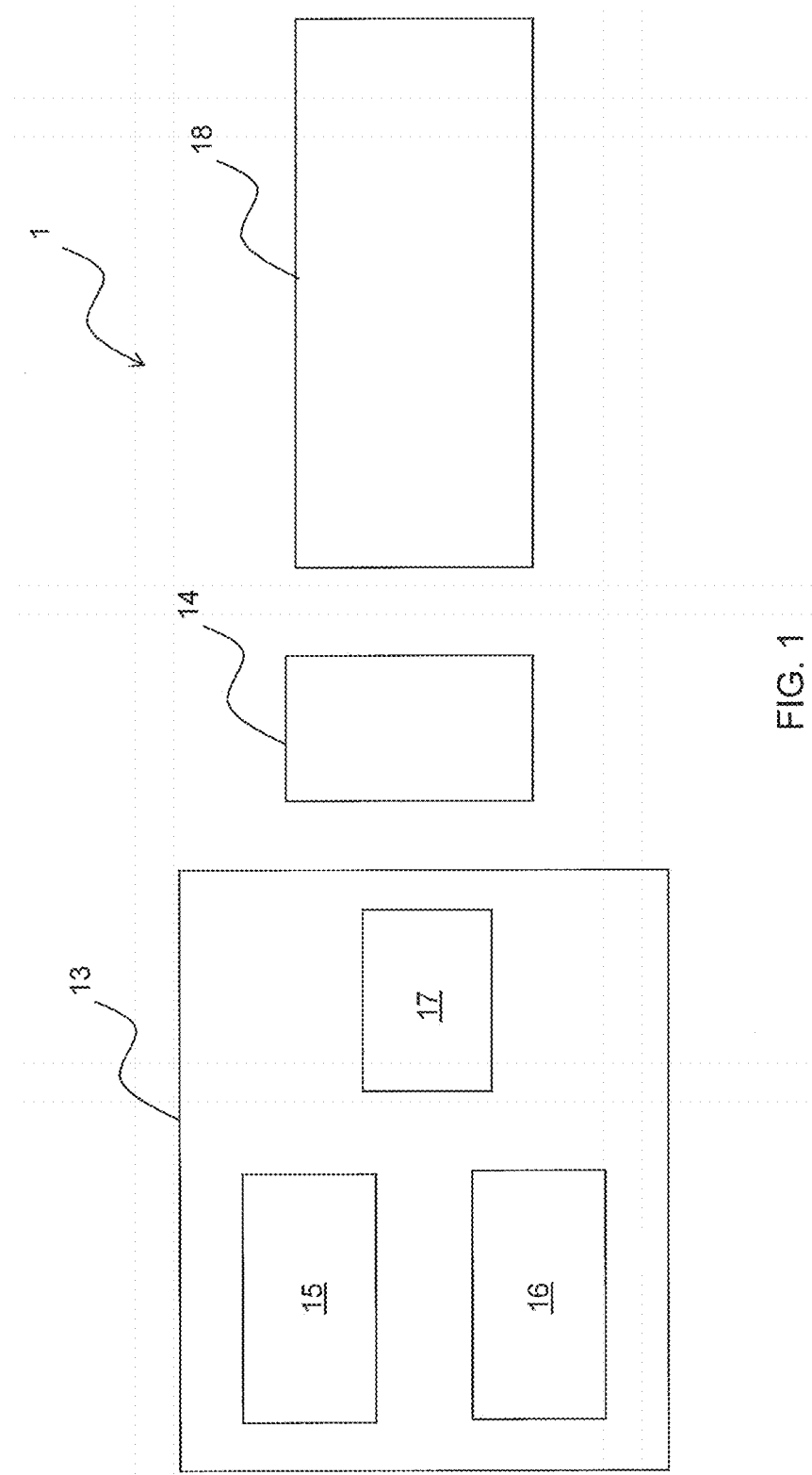

acquiring images of at least part of the surface of the tyre using the image acquisition devices, set according to the adjusted setting.

35 Claims, 7 Drawing Sheets

(51) Int. Cl.

| | | |
|---|---|---|
| G01N 21/954 | (2006.01) | |
| G06T 7/00 | (2017.01) | |
| G06T 7/60 | (2017.01) | |
| H04N 5/225 | (2006.01) | |
| H04N 5/247 | (2006.01) | |
| G01M 11/08 | (2006.01) | |
| G01B 11/245 | (2006.01) | |
| G01B 11/25 | (2006.01) | |

(52) U.S. Cl.
CPC ......... *G01M 11/081* (2013.01); *G01N 21/952* (2013.01); *G01N 21/954* (2013.01); *G06T 7/001* (2013.01); *G06T 7/0006* (2013.01); *G06T 7/60* (2013.01); *H04N 5/2256* (2013.01); *H04N 5/247* (2013.01); *G01N 2201/102* (2013.01)

(58) Field of Classification Search
CPC ...... G01M 13/00; G01M 15/00; G01M 17/00; G01M 17/02; G01M 17/021; G01M 17/022; G01M 11/0264; G01M 17/0074; G01M 1/26; G01M 3/027; G01M 3/04; G01M 3/16; G01M 3/20; G01M 3/3218; C08K 5/32; G01B 11/245; G01B 11/2522; G01N 21/952; G01N 21/954; G01N 2201/102; H04N 5/2256; H04N 5/247; G06T 7/60; G06T 7/001; G06T 7/0006
See application file for complete search history.

(56) References Cited

U.S. PATENT DOCUMENTS

| | | | |
|---|---|---|---|
| 9,139,090 B1* | 9/2015 | Huang | B60K 31/00 |
| 9,677,879 B2* | 6/2017 | Mizutani | G01B 11/2522 |
| 9,835,524 B2* | 12/2017 | Boffa | G01M 17/027 |
| 10,118,448 B2* | 11/2018 | Mizutani | B60C 19/00 |
| 10,121,238 B2* | 11/2018 | Krolczyk | G01N 21/952 |
| 10,598,569 B2* | 3/2020 | Okada | G01M 17/022 |
| 2007/0209431 A1 | 9/2007 | Fujisawa et al. | |
| 2011/0288814 A1* | 11/2011 | Mizutani | G06T 7/344 |
| | | | 702/150 |
| 2012/0007956 A1 | 1/2012 | Joly | |
| 2012/0242824 A1 | 9/2012 | Takahashi et al. | |
| 2014/0373614 A1 | 12/2014 | Steinbichler et al. | |
| 2015/0109626 A1 | 4/2015 | Harris | |
| 2015/0226644 A1* | 8/2015 | Boffa | G01M 17/027 |
| | | | 356/237.5 |
| 2016/0225128 A1* | 8/2016 | Krolczyk | G01M 17/021 |
| 2016/0263952 A1* | 9/2016 | Mizutani | B60C 25/007 |
| 2016/0321519 A1 | 11/2016 | Chan et al. | |
| 2017/0003198 A1* | 1/2017 | Imamura | G01M 17/02 |
| 2017/0059496 A1* | 3/2017 | Shaughnessy | G01N 23/185 |
| 2017/0092021 A1 | 3/2017 | Nielsen et al. | |
| 2017/0124425 A1 | 5/2017 | Miller | |
| 2017/0153163 A1* | 6/2017 | Okada | G05B 15/02 |
| 2017/0370807 A1* | 12/2017 | Boffa | G01M 17/021 |

FOREIGN PATENT DOCUMENTS

| | | |
|---|---|---|
| JP | H09297086 A | 11/1997 |
| WO | 2013/190448 A1 | 12/2013 |
| WO | 2015/044194 A1 | 4/2015 |

OTHER PUBLICATIONS

Chinese First Office Action for Chinese Application No. 201780030287.4 dated Jul. 24, 2019, 19 pages. English + Chinese translation.
Russian Decision to Grant for RU Application No. 2018142780 filed on May 17, 2017 on behalf of Pirelli Tyre S.P.A. dated Jun. 29, 2020 21 pages (English + Original).
Russian Search Report for RU Application No. 2018142780 filed on May 17, 2017 on behalf of Pirelli Tyre S.P.A. dated Jun. 29, 2020 4 pages (English + Original).

* cited by examiner

METHOD AND LINE FOR CHECKING TYRES FOR VEHICLE WHEELS

CROSS REFERENCE TO RELATED APPLICATIONS

The present application is the U.S. National Stage of International Patent Application No. PCT/IB2017/052894 filed on May 17, 2017 which, in turn, claims priority to Italian Application No. UA2016A003534 filed on May 18, 2016.

The invention relates to a method and a line for checking tyres for vehicle wheels.

The present invention is in the field of checks carried out on tyres, preferably molded and vulcanized, adapted for verifying the conformity thereof to the design specifications and, in particular, for detecting possible external defects (on the radially outer and/or radially inner surfaces) and/or defects inside the structure of the tyre and thus for thus for allowing those conforming to the standard to be sent to storage and the defective ones to be discarded.

A tyre for vehicle wheels typically comprises a carcass structure, shaped according to a substantially toroidal configuration, comprising at least one carcass ply having respectively opposite end portions. The latter are engaged at respective annular anchoring structures, each of them normally formed by at least one substantially circumferential annular insert called "bead core" on which at least one filling insert is generally applied, tapering radially going away from the rotation axis. The annular anchoring structures are arranged in areas usually identified with the name "beads". The beads have an inner diameter substantially corresponding to a so-called "fitting diameter" of the tyre on a respective mounting rim. The tyre also comprises a crown structure comprising at least one belt strip arranged in radially outer position with respect to the carcass ply with respect to the rotation axis of the tyre and a radially outer tread band with respect to the belt strip. On the tread band there are typically shaped longitudinal and transversal grooves, arranged to define a desired tread pattern. Between the tread band and the belt strip(s) it is possible to arrange a so-called "underlayer" made of elastomeric material having properties suitable for ensuring a stable connection of the belt strip(s) with the tread band itself. The tyre also comprises a pair of so-called sidewalls made of elastomeric material that represent the axially outer surfaces of the tyre, with respect to a middle plane perpendicular to the rotation axis of the tyre itself. For example, the sidewalls represent the axially outer surfaces with respect to the annular anchoring structures, to the carcass ply(-ies), to the belt strip(s) and possibly to at least one portion of tread band. The whole of the portion of each sidewall close to the respective side edge of the tread band and of each portion of the tread band close to the respective sidewall is known as "shoulder" of the tyre.

In "tubeless" tyres, there is, in a radially inner position with respect to the carcass ply, at least one layer of elastomeric material, usually called "liner", having air-tightness characteristics and generally extending from one bead to another.

The production cycles of a tyre foresee that, following a building process in which the various structural components of the tyre itself are made and/or assembled, the built green tyres are transferred into a molding and vulcanization line where a molding and vulcanization process is carried out, adapted for defining the structure of the tyre according to a desired geometry and tread pattern.

The term "elastomeric material" is meant to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked through heating, so as to form the final manufactured product.

The term "green tyre" is meant to indicate a tyre obtained by the building process and not yet molded and vulcanized.

The term "finished tyre" is meant to indicate a finished tyre obtained by the building process and subsequently molded and vulcanized.

The term "tyre" is meant to indicate a finished tyre or a green tyre.

The term "model" of tyre, is meant to indicate a set of geometric characteristics that distinguishes a tyre, namely, for example, width of the section, height of the sidewalls, fitting diameter and/or external diameter.

The terms "axial", "axially", "radial", "radially", "circumferential" and "circumferentially" are used with reference to the tyre.

In particular, the terms "axial" and "axially" are meant to indicate references/magnitudes arranged/measured or extending in a direction substantially parallel to the rotation axis of the tyre.

The terms "radial" and "radially" are meant to indicate references/magnitudes arranged/measured or extending in a direction that intersects the rotation axis of the tyre and lies in a plane perpendicular to such a rotation axis.

A radial section plane of a tyre contains the rotation axis thereof.

The terms "circumferential" and "circumferentially" are meant to indicate references/magnitudes arranged/measured or extending along a circumference developing around the rotation axis of the tyre.

The term "tyre profile" is meant to indicate the outline of at least part of the surface of the tyre, preferably of at least one from the outer surface and the inner surface of the tyre. Preferably, it is meant to indicate the three-dimensional outline (in other words, taken both circumferentially and radially) of the outer surface of at least one axial half of the tyre.

The term "surface" of a tyre is meant to indicate the entire surface of the finished, molded and vulcanized tyre.

The terms "outer surface" and "inner surface" of the tyre are meant to respectively indicate the surface that remains visible after the coupling of the tyre with its mounting rim and that no longer visible after said coupling.

The term "outer side surface" of the tyre is meant to indicate the outer surface of a sidewall and of the respective bead and shoulder.

The term "inner side surface" of the tyre is meant to indicate the inner surface of the tyre at a sidewall and at the respective bead and shoulder.

The term "level" referring to a portion of (inner or outer) side surface of tyre is meant to indicate a geometric magnitude of the tyre that identifies, in a radial section plane of the tyre that contains the rotation axis of the tyre, the distance, along a parallel to the rotation axis of the tyre, between the portion of (inner or outer) side surface and an axial middle plane of the tyre that is perpendicular to the rotation axis thereof.

The term "digital image", or equivalently "image", is meant to indicate in general a set of data, typically contained in a computer file, wherein each n-tuple of coordinates (typically each pair of coordinates) of a finite set (typically two-dimensional and matrix-type, i.e. N rows×M columns) of n-tuples of spatial coordinates (each n-tuple corresponding to a "pixel") is associated with a corresponding set of numerical values (which can be representative of magnitudes of a different type). For example, in monochromatic images (like those on the 'grayscale') such a set of values consists of a single value in a finite scale (typically having 256 levels or tones), such a value being for example representative of the level of luminosity (or intensity) of the respective n-tuple of spatial coordinates when visualized. A further example is represented by the color images, wherein the set of values represents the level of luminosity of a multiplicity of colors, or channels, typically the primary colors (for example in the RGB code red, green and blue, whereas in the CMYK code cyan, magenta, yellow and black). The term 'image' does not necessarily imply the effective visualization thereof.

Every reference to a specific "digital image" (for example the digital image acquired on the tyre) more generally includes any digital image that can be obtained through one or more digital processing of said specific digital image (like for example filtering, equalizations, 'smoothing', binarizations, thresholding, morphological transformations ('opening', etc.), derivative or integral calculations, etc.).

The term "two-dimensional image" or "2D" means a digital image each pixel of which is associated with information representative of the reflectivity/diffusivity and/or of the color of the surface, such as the images detected by common digital camera or video cameras (e.g. with CCD).

The term "three-dimensional image" or "3D" denotes a digital image each pixel of which is associated with altitude information of the surface.

The terms "low resolution" and "high resolution" are meant to indicate resolutions that differ from one another. Preferably "low resolution" and "high resolution" are resolutions that differ from one another by at least 3 times, in the sense that high resolution can make it possible to identify two distinct points that are three times closer with respect to the identification of the same points as allowed by the low resolution. This means, for example, that if low resolution is 0.3 mm high resolution is less than or equal to 0.1 mm.

The term low resolution can mean, for example, a resolution greater than or equal to 0.3 mm, preferably comprised between about 0.3 mm and about 2 mm and even more preferably between about 0.3 mm and about 5 mm.

The term high resolution can mean, for example, a resolution of less than 0.3 mm, preferably comprised between about 0.01 mm and about 0.3 mm and even more preferably comprised between about 0.05 mm and about 0.3 mm.

The term "set" is meant to indicate the action of arranging a device to operate according to certain parameters, in particular to be positioned according to predetermined coordinates (for example Cartesian coordinates of the barycenter of the device and Euler angles) which define the position of said device in space relative to a reference system (for example Cartesian).

The term "setting" is meant to indicate a set of parameters that regulates the operation of a device, in particular a set of coordinates that regulate the positioning of the device in space relative to a reference system (for example Cartesian).

The term "axial half of the tyre" is meant to indicate a half of the tyre delimited by an axial middle plane perpendicular to the rotation axis of the tyre and equidistant from the beads of the tyre itself.

The term "at least one axial half of the tyre" is meant to indicate a complete half as defined above plus, possibly, a further portion of the other half that extends axially from the aforementioned middle plane.

The term "radial half of the tyre" is meant to indicate a half of the tyre delimited by a radial plane thereof.

The term "radial plane" of the tyre is meant to indicate any plane that comprises the rotation axis of the tyre.

The term "at least one radial half of the tyre" is meant to indicate a complete half as defined above plus, possibly, a further portion of the other half that extends circumferentially from the aforementioned middle plane.

The term "building/production cycle time" is meant to indicate the time that elapses between the exit of a built/finished tyre from the building/production line, and the exit of the next tyre.

The term "checking cycle time" is meant to indicate the time that elapses between the exit of a checked tyre from the checking line and the exit of the next tyre.

The terms "low", "high", "below" and "above" identify the relative position of an element, like for example a component of a tyre, a tyre, an apparatus, a device, etc., with respect to the ground or of one of said elements with respect to another element.

In a production process, the tyres are subjected to checks in order to verify the possible presence of production defects and/or anomalies.

WO 2015/044194 describes a method and a line for inspecting tyres wherein: a first macroscopic inspection post comprises means for rotating a tyre and for acquiring a macroscopic image of a tyre and means for comparing the macroscopic image with a reference image that is representative of a desired toroidal shape and detecting possible variations in shape; a second microscopic inspection post comprises means for rotating a tyre and for acquiring a microscopic image of a tyre and means for comparing the microscopic image with a reference image that is representative of a desired surface condition and detecting possible local surface variations; transferring means for transferring the tyre from the first inspection post to a discharge point or to the second inspection post.

In automated systems for checking tyres, the Applicant has perceived the need to carry out an accurate check of all of the tyres coming out from a building/production line of tyres with times and procedures that are compatible with the building/production cycle time set by the line itself.

The Applicant has observed that this would be extremely advantageous in order to be able to retroact quickly on the building/production line and adjust the process parameters so that a possible defect can be eliminated or so that an anomaly that is not a true defect on the checked tyres can be eliminated and not result in real defects on subsequent tyres.

The Applicant has observed that in order to carry out accurate checks, capable of detecting even very small defects and/or defects located in areas (for example of the inner surface) of the tyre that are difficult to reach for the image acquisition devices, it is essential for the image acquisition devices to be accurately set in order to ensure the acquisition of precise images, at high resolution and properly focused, at the same time avoiding carrying out improper maneuvers that can damage the devices themselves.

In particular, in plants that produce a large number of different tyre models differing in size (fitting diameter, sidewall height, section width, external diameter etc.) and in type (automobile, motorcycle, truck, winter tyres, summer tyres, self-sealing tyres, run-flat tyres, etc.), the Applicant has observed that the image acquisition devices must be accurately set according to the profile of the specific tyre model being checked.

In this context, the Applicant has observed that also the tyres belonging to a same model can have variable geometric characteristics, as a function of the constructive characteristics and the materials used. In particular, the Applicant has observed that, generally, the tyres being checked are still deflated and, therefore, intrinsically deformable. The geometric characteristics of the tyres being checked of a same model are therefore intrinsically variable and can vary according to the test conditions, the checking schedule, the transportation, storage and manipulation conditions of the tyre to be checked. For example, such geometric characteristics can vary as the tyre being checked passes from resting on one sidewall to the other and/or as a function of the post-vulcanization temperature that depends on the time elapsed from the end of the molding and vulcanization process to the start of the checking process and/or according to how the tyre has been stored/manipulated/transported before being subjected to the check. The Applicant has, therefore, observed that it is important for the image acquisition devices to be accurately set taking into account such inevitable variations of the geometric characteristics of the tyres belonging to a same model.

This problem is not faced by WO 2015/044194 which does not consider the aforementioned variations of the geometric characteristics of the tyres to be checked and describes a single and fixed positioning of the image acquisition devices with respect to the tyre.

The Applicant has perceived that the problems outlined above can be overcome through a self-adjustment mechanism that makes it possible to automatically and optimally adjust the setting of the image acquisition devices to be used to check tyres belonging to a same model, taking into account the intrinsic variability of the geometric characteristics thereof.

More precisely, the Applicant has found that such problems can be overcome by acquiring preliminary images of the tyre to be checked and obtaining from these a deviation between one or more geometric characteristics obtained from the preliminary images and those stored in the model associated with the tyre to be checked, finally adjusting, as a function of said deviation, the setting for the suitable set of image acquisition devices that will proceed to check the aforementioned tyre.

In accordance with a first aspect thereof, the invention relates to a method for checking a tyre for vehicle wheels.

Preferably, the tyre is associated with a model with which a setting for a set of image acquisition devices is associated.

Preferably, the method comprises a) obtaining the model associated with said tyre.

Preferably, the method comprises b) acquiring preliminary images of said tyre.

Preferably, the method comprises c) obtaining, from said acquired preliminary images, at least one adjustment value representative of at least one geometric characteristic of the tyre.

Preferably, the method comprises d) calculating a deviation between said at least one adjustment value and a respective reference value, associated with said model.

Preferably, the method comprises e) adjusting the setting associated with the model of tyre based on the calculated deviation and inspecting said tyre to look for possible production defects by acquiring images of at least part of the surface of the tyre, using the set of image acquisition devices set according to the setting thus adjusted.

The Applicant considers that, using the aforementioned solution, the tyre checking method enables to make, on an industrial scale, an automated checking system at the same time meeting the requirements outlined above particularly concerning the accuracy of the checks and the flexibility and specificity of the entire checking system with regard to each tyre.

In particular, the Applicant considers that the aforementioned adjustment of the setting associated with the model of tyre for the set of image acquisition devices enables to position such devices precisely, taking into account the intrinsic variability of at least one geometric characteristic of the tyres belonging to a same model of tyre, so as to ensure the acquisition of precise images, at high resolution and properly focused for each single tyre being checked, at the same time safeguarding the integrity of the devices themselves.

The Applicant also considers that the aforementioned procedure makes it possible to automatically adjust the setting of the set of image acquisition devices without substantially impacting upon the checking cycle time, keeping it compatible with the building/production cycle time set by the line itself.

In accordance with a second aspect thereof, the invention relates to a checking line of a tyre for vehicle wheels.

Preferably, the tyre is associated with a model.

Preferably, the checking line comprises a plurality of checking stations.

Preferably, the plurality of checking stations comprises a set of image acquisition devices.

Preferably, the plurality of checking stations comprises preliminary image acquisition devices.

Preferably, the checking line comprises a memory.

Preferably, the memory comprises, in association with said model, a setting for the set of image acquisition devices.

Preferably, the memory comprises, in association with said model, at least one reference value for at least one geometric characteristic of the tyre.

Preferably, the checking line comprises a processor.

Preferably, the processor is configured to obtain, from preliminary images acquired by the preliminary image acquisition devices, at least one adjustment value representative of said at least one geometric characteristic of the tyre.

Preferably, the processor is configured to calculate a deviation between said at least one adjustment value and the respective reference value, associated with said model in said memory.

Preferably, the processor is configured to adjust the setting associated with the model of tyre based on the calculated deviation and inspect said tyre to look for possible production defects by acquiring images of at least part of the surface of the tyre, using the set of image acquisition devices set according to the setting thus adjusted.

The present invention in at least one of the aforementioned aspects can have at least one of the following preferred characteristics.

Preferably, it is established whether said at least one geometric characteristic of the tyre is in compliance with reference specifications for said model.

Preferably, activities c), d) and e) are carried out if said at least one geometric characteristic is in compliance with said reference specifications.

Preferably, said reference specifications for said model comprise a first threshold. More preferably, establishing whether said at least one geometric characteristic of the tyre is in compliance with said reference specifications comprises at least one from the following actions:

obtaining from said acquired preliminary images a control value relative to said at least one geometric characteristic of the tyre, comparing said control value with said first threshold, establishing the conformity of said at least one geometric characteristic when said control value is less than or equal to said first threshold and the non-compliance when said control value is greater than said first threshold.

Preferably, said reference specifications for said model comprise a first threshold and a second threshold, smaller than the first threshold. More preferably, establishing whether said at least one geometric characteristic of the tyre is in compliance with said reference specifications comprises at least one from the following actions:

obtaining from said acquired preliminary images a control value relative to said at least one geometric characteristic of the tyre, comparing said control value with said first threshold and said second threshold, establishing the compliance of said at least one geometric characteristic when said control value is less than or equal to said first threshold and greater than or equal to said second threshold, establishing the non-compliance of said at least one geometric characteristic when said control value is greater than said first threshold or less than said second threshold.

Preferably, said control value is different from said adjustment value.

In an alternative embodiment, said control value is the same as said adjustment value.

Preferably, when said control value is greater than said first threshold, the tyre is discarded without carrying out activities c), d) and e).

Preferably, when said control value is less than said second threshold, said tyre is inspected to look for possible production defects by acquiring images of at least part of the surface of the tyre, using the set of image acquisition devices set according to the setting associated with the model of tyre without carrying out activities c), d) and e).

Preferably, from said preliminary images a profile of a portion of the tyre is obtained.

More preferably, in c) said at least one adjustment value is obtained from said profile.

Preferably, from said preliminary images a profile of a portion of the tyre is obtained and said control value relative to said at least one geometric characteristic of the tyre is obtained from said profile.

Preferably, said respective reference value corresponds to said adjustment value in a reference profile, associated with said model of tyre, corresponding to the obtained profile.

Preferably, in b) said preliminary images are acquired at low resolution. The profile obtained from said preliminary images is preferably at low resolution.

The reference profile is preferably at high resolution.

Preferably, said portion of the tyre the profile of which is obtained is an outer surface portion of the tyre.

Preferably, said portion of the tyre the profile of which is obtained is at least one outer side surface portion of the tyre.

Preferably, said setting comprises a plurality of positions for said set of image acquisition devices that allow said set of image acquisition devices to acquire images of said at least part of the surface of the tyre.

Preferably, in c) said at least one adjustment value is representative of said at least one geometric characteristic of the tyre at a respective position among said plurality of positions.

Preferably, said respective position among said plurality of positions allows said acquisition of images relative to at least one from: at least one outer side surface portion of the tyre and at least one inner side surface portion of the tyre.

Preferably, said plurality of positions for said set of image acquisition devices is defined based on said reference profile.

Preferably, said plurality of positions for said set of image acquisition devices is adapted to allow said set of image acquisition devices to acquire images without interfering with said reference profile.

Preferably, said at least one geometric characteristic of the tyre comprises at least one from: level of an outer side surface portion and level of an inner side surface portion of the tyre, wherein, in a radial section plane of the tyre that contains the rotation axis of the tyre, said level represents the distance, along a parallel to said rotation axis, between said outer or inner side surface portion and an axial middle plane of the tyre, perpendicular to the rotation axis of the tyre.

Preferably, in b) said preliminary images are acquired through preliminary image acquisition devices arranged according to predetermined positions.

Preferably, in b) the preliminary images of an outer surface portion of the tyre are acquired during a translation of the tyre, along an advancing direction, with respect to said preliminary image acquisition devices that remain stationary in the respective predetermined positions, said advancing direction being perpendicular to the rotation axis of the tyre.

Preferably, said outer surface portion of which the preliminary images are acquired is at least one outer side surface portion of the tyre.

Preferably, said acquisition of preliminary images of the outer surface portion of the tyre comprises the formation of two slit lights on a plane substantially perpendicular to said advancing direction, adapted to illuminate as a whole said outer surface portion of the tyre while it translates along said advancing direction.

Preferably, a variation of the deviation calculated in d) is obtained for different tyres associated with said model.

Preferably, if the obtained variation satisfies predetermined conditions, the setting associated with the model of tyre is replaced with a setting adjusted based on the variation obtained.

Preferably, activities a) to e) are carried out in a checking cycle time during the passage of the tyre along a checking path.

Preferably, the images acquired in e) of said at least part of the surface of the tyre comprise images of at least part of the outer surface of the tyre.

Alternatively or in addition, the images acquired in e) of at least part of the surface of the tyre preferably comprise images of at least part of the inner surface of the tyre.

Preferably, in said activity of inspecting said tyre to look for possible production defects a circumferential exploration of said at least part of the surface of the tyre is provided for.

Preferably, a circumferential exploration of at least one first axial half of the tyre and, thereafter, of at least one second axial half of the tyre is provided for.

Preferably, in said activity of inspecting said tyre to look for possible production defects, the acquisition of images of said at least part of the surface of the tyre comprises: the acquisition of images of at least part of the surface of at least one first axial half of the tyre; the overturning of the tyre about an overturning axis; and the acquisition of images of at least part of the surface of at least one second axial half of the tyre.

Preferably, the overturning axis is perpendicular to the rotation axis of the tyre and belongs substantially to an axial middle plane of the tyre that delimits said first axial half and said second axial half of the tyre.

Preferably, in said activity of inspecting said tyre to look for possible production defects, during the acquisition of images of said at least part of the surface of the tyre, the tyre is rotated about its rotation axis with respect to the set of image acquisition devices, which remains stationary.

Preferably, the tyre is rotated by at least 360°.

Preferably, the processor is configured to obtain, from the preliminary images acquired by the preliminary image acquisition devices, a profile of a portion of the tyre, said at least one adjustment value being obtained from said profile.

Preferably, said portion of the tyre of which the profile is obtained is an outer surface portion of the tyre and said preliminary image acquisition devices are configured so as to acquire preliminary images of said outer surface portion of the tyre while it translates along an advancing direction, perpendicular to the rotation axis of the tyre.

Preferably, said outer surface portion of which the preliminary images are acquired is at least one outer side surface portion of the tyre.

Preferably, said preliminary image acquisition devices are configured so as to form two slit lights on a plane substantially perpendicular to said advancing direction of the tyre, the two slit lights being adapted to illuminate as a whole said outer surface portion of the tyre while it translates along said advancing direction.

Preferably, each slit light is adapted to illuminate at least one radial half of the tyre, defined by a radial plane thereof.

Preferably, the preliminary image acquisition devices are located at an input post of said plurality of checking stations that comprises a support for the tyre, said support comprising a conveyor belt adapted to convey the tyre along said advancing direction.

Preferably, the preliminary image acquisition devices are located at an input post of said plurality of checking stations, said plurality of checking stations being adapted to be traveled in sequence by the tyre according to a checking path starting from the input post.

Preferably, said preliminary image acquisition devices are supported by fixed support devices (not movable).

Preferably, the preliminary image acquisition devices are arranged according to predetermined positions (irrespective of the model of tyre).

Preferably, the devices of the set of image acquisition devices are operatively associated with respective support and movement devices comprising at least one robotized arm.

Preferably, the robotized arm is anthropomorphous. Even more preferably, said anthropomorphous robotized arm has at least 5 axes.

Preferably, each robotized arm can carry one or more devices.

Preferably, at least part of the checking stations of the plurality of checking stations comprises a support for the tyre adapted to rotate the tyre around its rotation axis with respect to the set of image acquisition devices, suitably positioned.

Preferably, said rotation is by at least 360°.

Preferably, the preliminary image acquisition devices are adapted to acquire low-resolution images.

Preferably, the devices of the set of image acquisition devices are adapted to acquire high-resolution images.

Preferably, the devices of the set of image acquisition devices are in part adapted to acquire three-dimensional images and in part adapted to acquire two-dimensional images.

Preferably, the preliminary image acquisition devices are adapted to acquire three-dimensional images.

Preferably, the devices of the set of image acquisition devices and of said preliminary image acquisition devices each comprise a video camera, an illumination device and, possibly, a mirror system comprising at least one mirror.

Preferably, the illumination device comprises a laser and/or LED source.

Preferably, the illumination device comprises an optic an optic adapted to transform a punctiform laser light into a slit light.

The processor is preferably located at least in part at the checking line.

Figure 2:
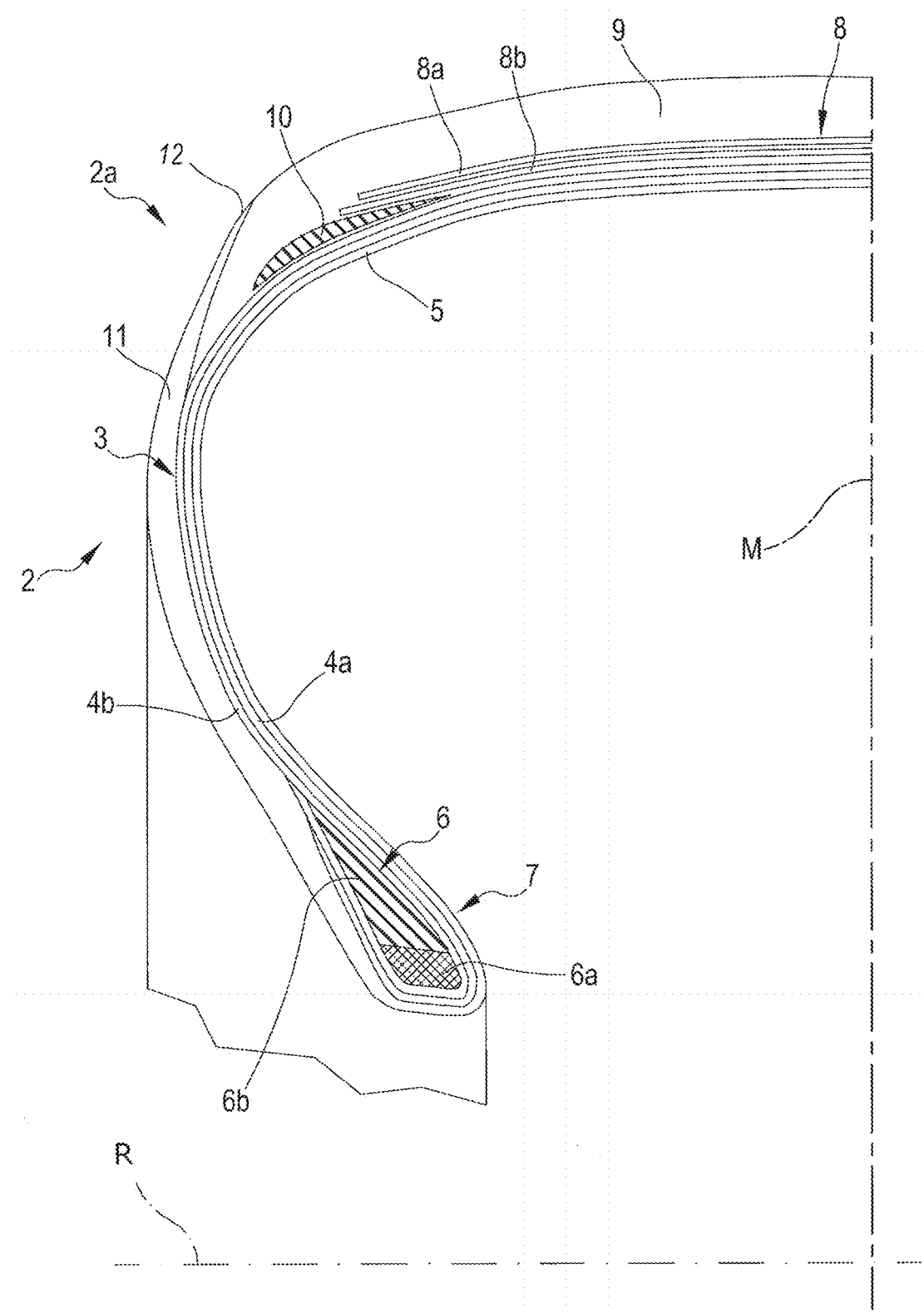
Figure 3:
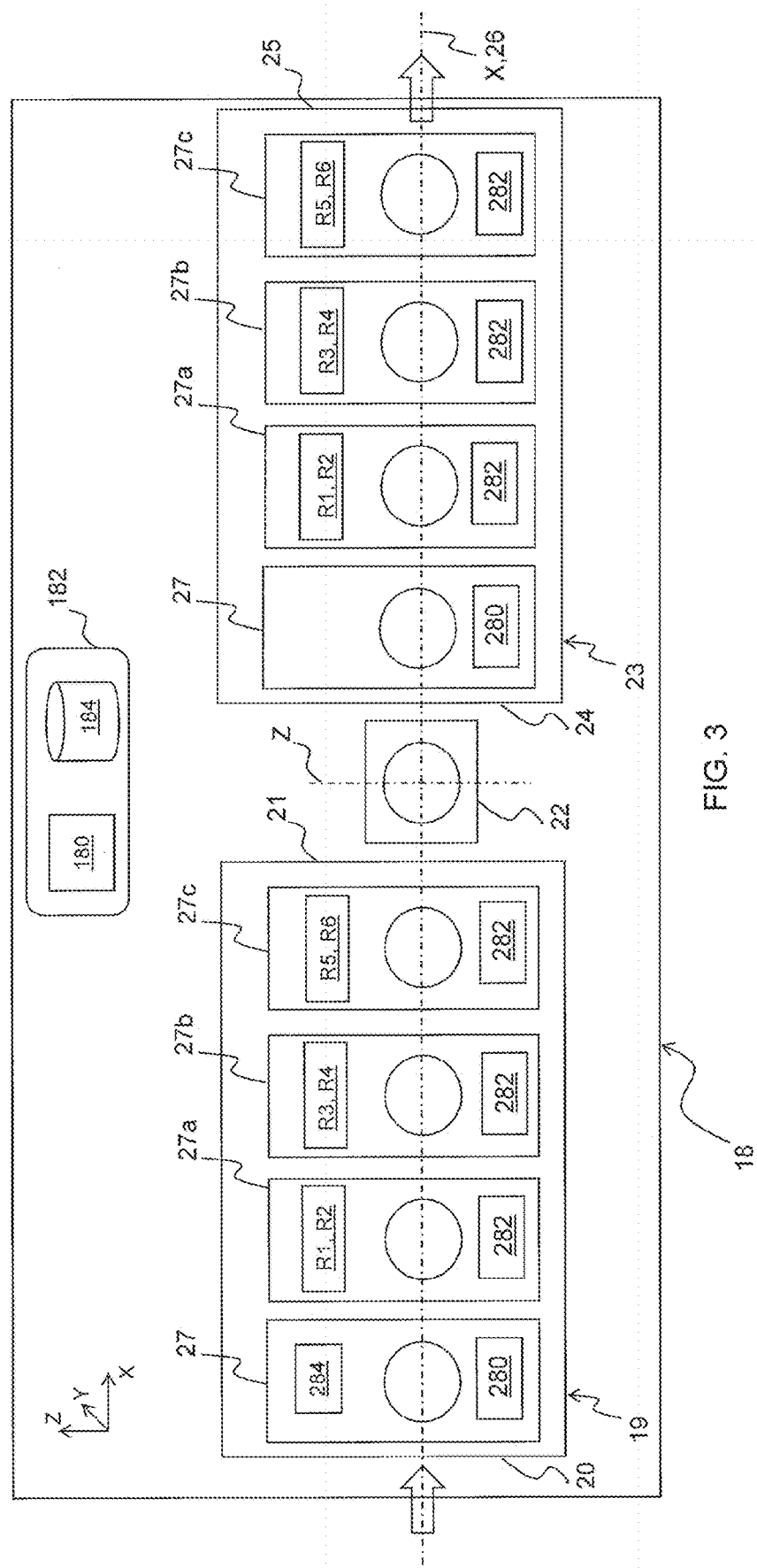
Figure 4:
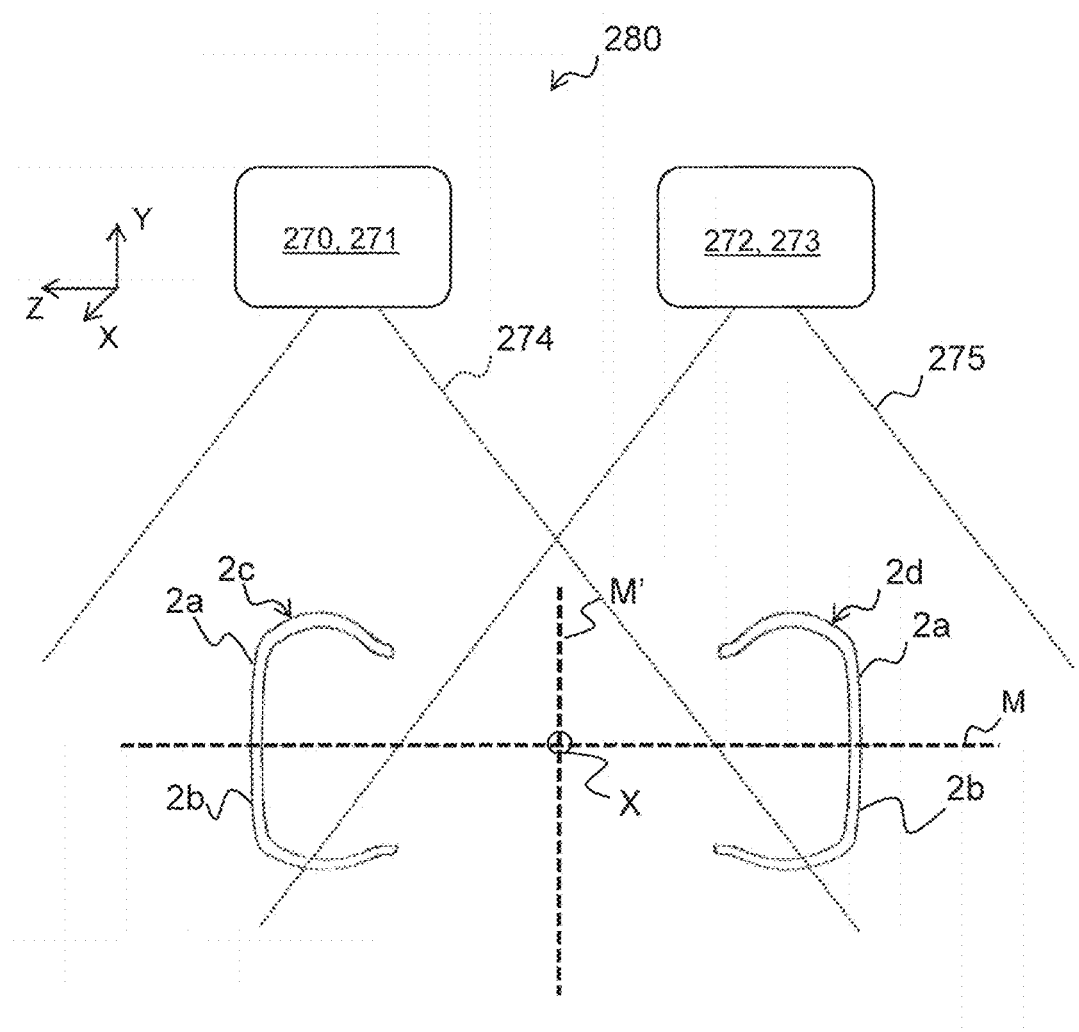
Figure 5:
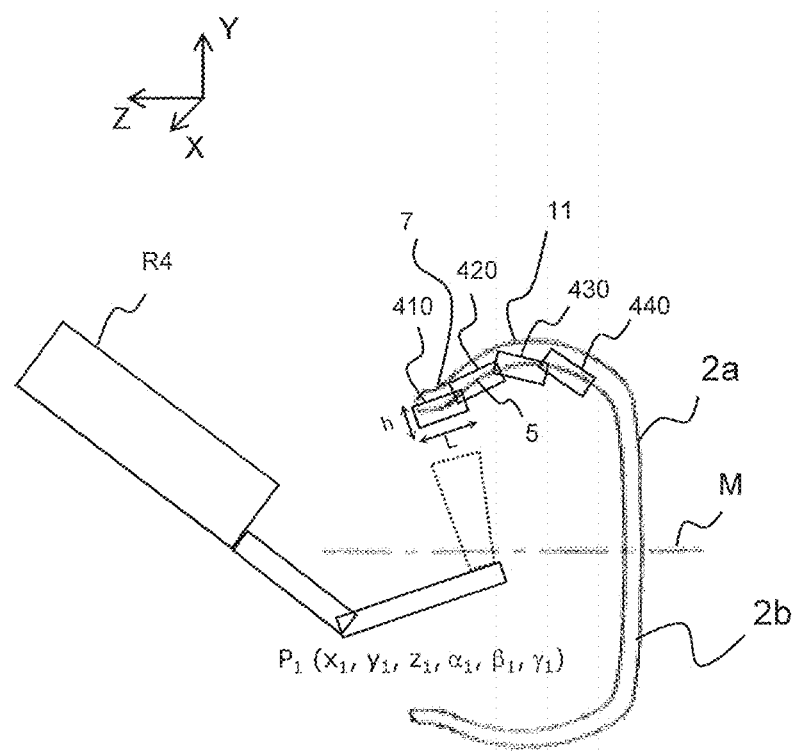
Figure 6:
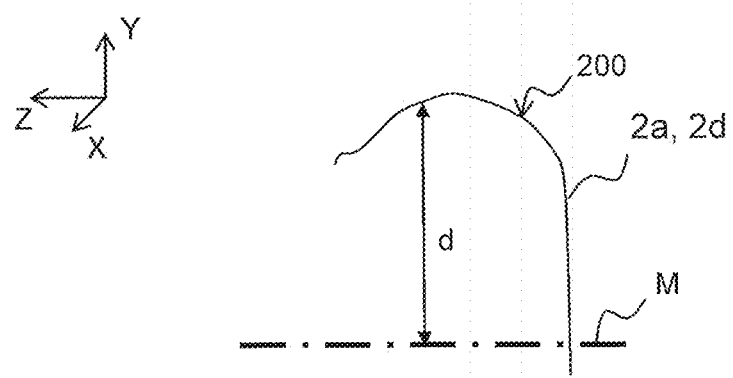
Figure 7:
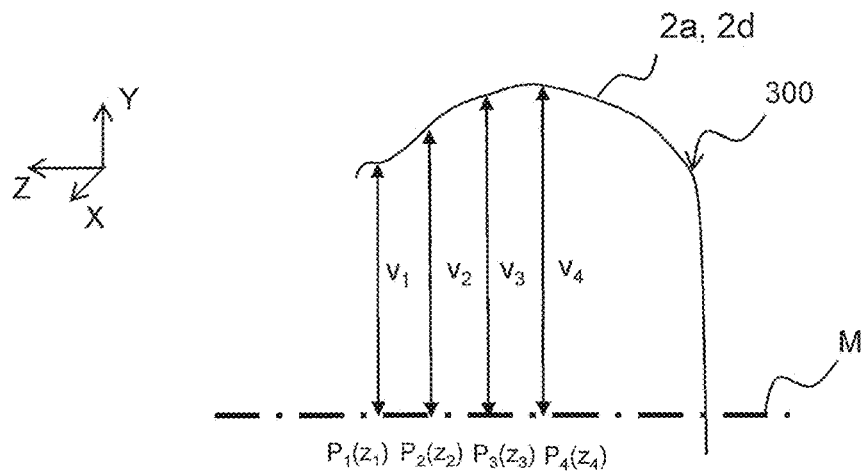
Figure 8:
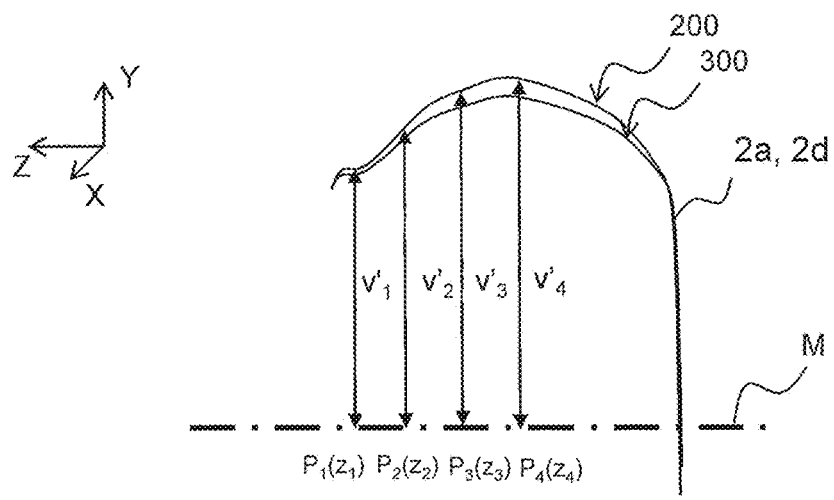
Figure 9:
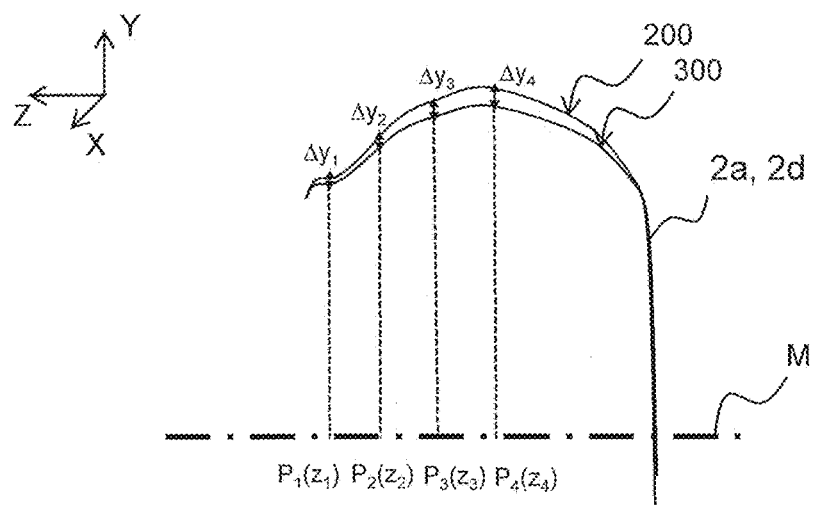
Figure 10:
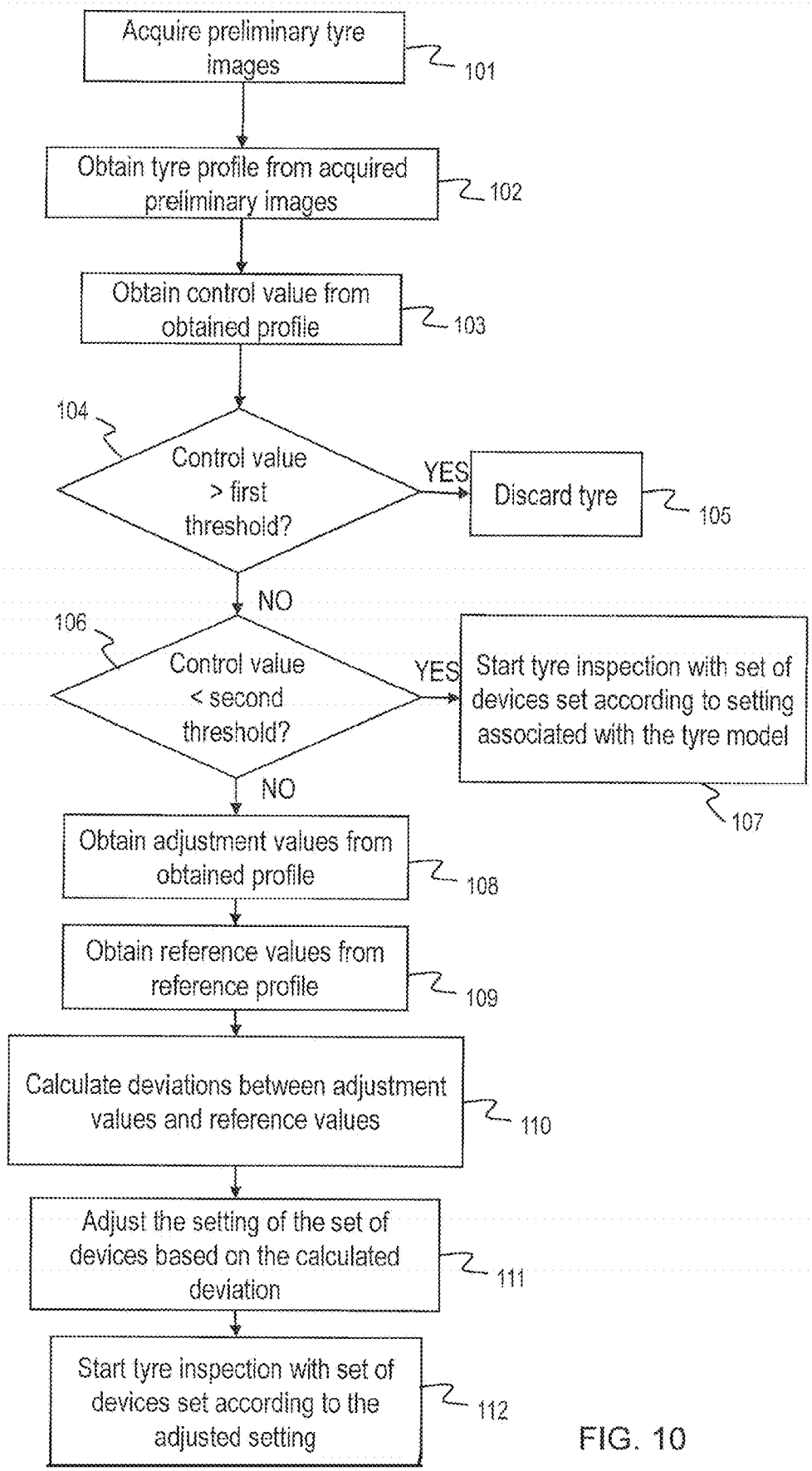

The processor can be located at least in part in a remote location with respect to the checking line Further characteristics and advantages of the present invention will become clear from the following detailed description of some embodiments thereof, provided only as non-limiting examples, said description being made with reference to the attached drawings, in which:

FIG. 1 schematically shows a plant for producing tyres for vehicle wheels;

FIG. 2 shows a radial half-section of a tyre;

FIG. 3 schematically shows an embodiment of a checking line of the plant of FIG. 1;

FIG. 4 schematically shows an embodiment of preliminary image acquisition devices, adapted to acquire preliminary images of the outer surface of at least one first axial half of the tyre;

FIG. 5 schematically shows a position among four positions of an image acquisition device, as defined by the setting associated with a model of tyre for the set of image acquisition devices;

FIG. 6 schematically shows a reference tyre profile;

FIG. 7 schematically shows a tyre profile obtained from preliminary images acquired from a tyre being checked;

FIGS. 8 and 9 schematically compare the profiles of FIG. 6 and FIG. 7;

FIG. 10 schematically shows a flow diagram of an embodiment of an algorithm that can be used to carry out the checking method of the invention.

FIG. 1 shows a plant 1 for producing tyres 2 for vehicle wheels.

FIG. 2 shows an example of a tyre 2 that can be produced in the plant 1. The tyre 2 has an axial middle plane M, perpendicular to the rotation axis R of the tyre 2 (it should be specified that in FIG. 2 the position of the rotation axis R with respect to the section of the tyre 2 is shown in a totally indicative and schematic manner). The axial middle plane M divides the tyre 2 into a first axial half 2a and into a second axial half 2b. For the sake of simplicity of illustration, FIG. 2 shows only the first axial half 2a of the tyre 2, the other half 2b being substantially the mirror image (apart from the tread pattern that may not be symmetrical with respect to the aforementioned middle plane M).

The tyre 2 essentially comprises a carcass structure 3 having one or two carcass plies 4a, 4b. A layer of impermeable elastomeric material or so-called liner 5 is applied inside the carcass ply(-ies) 4a, 4b. Two annular anchoring structures 6 (only the axial half of which 2a is shown in FIG. 2) are engaged, in axially opposite positions (with respect to the middle plane M), at respective end edges of the carcass ply(-ies) 4*a*, 4*b*. The two annular anchoring structures 6 each comprise a so-called bead core 6*a* carrying an elastomeric filler 6*b* in radially outer position. The two annular anchoring structures 6 are integrated close to areas usually identified with the name "beads" 7 (only the axial half of which 2*a* is shown in FIG. 2), at which the engagement between the tyre 2 and a respective mounting rim (not shown) usually takes place. A belt structure 8 comprising belt layers 8*a*, 8*b* is circumferentially applied around the carcass ply(-ies) 4*a*, 4*b*, and a tread band 9 is circumferentially juxtaposed over the belt structure 8. The belt structure 8 comprise a further layer (not illustrated), known as zero degrees, in a radially outer position with respect to the aforementioned layers 8*a*, 8*b*. The belt structure 8 can also be associated with so-called "sub-belt inserts" 10 each arranged between the carcass ply(-ies) 4*a*, 4*b* and one of the axially opposite end edges of the belt structure 8. Two sidewalls 11, each extending from the corresponding bead 7 to a corresponding side edge of the tread band 9, are applied in axially opposite positions (with respect to the middle plane M) on the carcass ply(-ies) 4*a*, 4*b*. The whole of the portion of each sidewall 11 close to the respective side edge of the tread band 9 and of each portion of the tread band 9 close to the respective sidewall 11 is known as shoulder 12 of the tyre.

With particular reference to FIG. 1, the plant 1 comprises a building line 13 of green tyres and a molding and vulcanization line 14 operatively arranged downstream of the building line 13.

In the non-limiting embodiment of the plant 1 illustrated in FIG. 1, the building line 13 comprises a carcass structure building line 15, a crown structure building line 16 and a shaping and assembly station 17.

In the carcass structure building line 15, forming drums (not illustrated) are moved between different work stations (not illustrated) configured to form, on each forming drum, the carcass structure 3 comprising the carcass ply(-ies) 4*a*, 4*b*, the liner 5, the annular anchoring structures 6 and possibly at least one part of the sidewalls 11.

At the same time, in the crown structure building line 16, one or more auxiliary drums (not illustrated) are moved in sequence between different work stations (not illustrated) configured to form on each auxiliary drum a crown structure, comprising at least the belt structure 8, the tread band 9, and possibly at least one part of the sidewalls 11.

In the shaping and assembly station 17 the carcass structure 3, formed on its own forming drum in the carcass structure building line 15, is shaped and assembled at the crown structure, formed in the crown structure building line 16.

In other embodiments of the plant 1, not illustrated, the building line 13 can be of a different type, for example arranged to form all of the aforementioned components on a single forming drum.

The green tyres manufactured by the building line 13 are transferred to the molding and vulcanization line 14 comprising one or more vulcanizers.

From the molding and vulcanization line 14 the finished tyres 2 come out in sequence one after the other with a predetermined frequency and a corresponding predetermined production cycle time Tcp.

Downstream of the molding and vulcanization line 14, the plant 1 comprises a checking line 18 configured to carry out a check of the tyres 2 after molding and vulcanization.

In addition or alternatively, the plant 1 can comprise a same checking line 18, arranged between the building line 13 and the molding and vulcanization line 14, configured to carry out a check of the green tyres before the molding and vulcanization step.

With particular reference to FIG. 3, the checking line 18 comprises a first checking unit 19 which has an inlet 20 for the finished tyres 2 to be checked that come from the molding and vulcanization line 14 and a respective outlet 21. Downstream of the first checking unit 19, at the outlet 21 of said first checking unit 19, an overturning and transporting device 22 is arranged. Downstream of the overturning and transporting device 22 a second checking unit 23 is positioned, which has an inlet 24 for the finished tyres 2 that come from the overturning and transporting device 22 and a respective outlet 25. The inlet 20 of the first checking unit 19 constitutes the inlet of the checking line 18. The outlet 25 of the second checking unit 23 constitutes the outlet of the checking line 18. The tyres 2 to be checked enter one after the other in sequence in the inlet 20, follow in sequence a checking path 26 inside the checking line 18 and come out through the outlet 25. In a preferred embodiment, the tyres follow the checking path 26 through a transportation system that implies a simultaneous displacement of all of the tyres 2, carrying out the translation by a fixed pitch, at constant time intervals. Along the checking path 26, which in the embodiment illustrated in FIG. 3 is rectilinear, the tyres 2 are subjected to checks in order to verify the possible presence of defects according to methods that will be described hereinafter.

In a variant embodiment (not illustrated), the first checking unit 19 and the second checking unit 23 are angled to one another to define two rectilinear segments of the checking path 26.

In a further variant embodiment (not illustrated), the first checking unit 19 and the second checking unit 23 are mutually juxtaposed. In particular, the second checking unit 23 can be arranged above (or below) the first checking unit 19 with the overturning and transporting device 22 arranged at terminal ends of the first checking unit 19 and of the second checking unit 23. The overturning and transporting device 22 is also configured in such a case to lift (or lower) the tyres 2 so as to carry them from the first checking unit 19 to the second checking unit 23.

In a further variant embodiment (not illustrated), the checking line 18 comprises a single checking unit (which performs the function of the first checking unit 19 and of the second checking unit 23). In this case, the overturning and transporting device 22 and suitable transportation devices are adapted for making the tyres 2 travel the same checking station twice, a first time with the first axial half 2*a* upwardly exposed and a second time with the second axial half 2*b* upwardly exposed.

In all of the embodiments described above, the first checking unit 19 and the second checking unit 23 (when present) each comprise an input post 27, a first checking station 27*a*, a second checking station 27*b* and a third checking station 27*c* arranged in sequence one after the other along the checking path 26.

Each input post 27 comprises a support (not illustrated) having a substantially horizontal support area configured to receive and support one of the two sidewalls 11 of the tyre 2 to be checked. The support area defines a conveyor belt configured for transferring the tyres 2 from the input post 27 to the first checking station 27*a*. The conveyor belt defines an advancing direction X during its translation movement.

Each of the quoted checking stations 27*a*, 27*b*, 27*c* comprises a support (not illustrated) for the tyre 2, configured to receive and support one of the two sidewalls 11 of the tyre 2 to be checked, upwardly exposing the other sidewall 11 of the tyre 2.

In a preferred embodiment (not shown), the support of the quoted checking stations 27a, 27b, 27c comprises a table rotating around a vertical rotation axis Y (perpendicular to the plane of the sheet of FIG. 3). The rotating table has a substantially horizontal support area configured to receive and support the sidewall 11 of the tyre 2. The rotating table also defines a conveyor belt configured for transferring the tyres 2 from one checking station 27a, 27b, 27c to a subsequent checking station 27b, 27c of the same checking unit 19, 23 or to the overturning and transporting device 22 or to the outlet 25. The conveyor belt is folded upon itself to define a closed path and defines, during its own movement, the advancing direction X that, with the rotating table stationary in rest position, coincides with the direction of the checking path 26. The conveyor belt has an upper arm that defines said support area of the rotating table.

The overturning and transporting device 22 is configured to overturn the tyre about a horizontal overturning axis Z, perpendicular to the advancing direction X and to the vertical direction Y, so as to upwardly expose, in the second checking unit 23, the sidewall 11 of the tyre that in the first checking unit 19 was downwardly exposed. In this way, the first checking unit 19 is adapted for operating on the first axial half 2a of the tyre 2 while the second checking unit 23 is adapted for operating on the second axial half 2b of the tyre 2.

Each input post 27 comprises preliminary image acquisition devices 280. Preferably, the preliminary image acquisition devices 280 are adapted for acquiring low-resolution images.

In the embodiment shown in FIG. 4, the preliminary image acquisition devices 280 comprise two low-resolution video cameras 270, 272 associated with two respective laser sources 271, 273. The resolution of the aforementioned video cameras is preferably comprised between about 0.3 mm and about 2 mm. Preferably, the two video cameras 270, 272 are adapted for acquiring three-dimensional images. Each laser source 271, 273 is associated with a suitable optic (not shown, for example a suitable cylindrical lens) adapted for transforming the pointed laser light into a respective slit light 274, 275. The two video cameras 270, 272 with the two respective laser sources 271, 273 are supported by fixed (non-movable) support devices (not illustrated) and are respectively adapted for acquiring images of the outer surface of two radial halves 2c, 2d of the tyre 2 while it advances along the advancing direction X (which in FIG. 4 is perpendicular to the plane of the sheet). The two radial halves 2c, 2d of the tyre 2 are defined by a radial plane M' of the tyre.

In particular, the two laser sources 271, 273 are adapted for forming the two slit lights 274, 275 on a plane (which in FIG. 4 corresponds to the plane of the sheet) substantially perpendicular to said advancing direction X so as to each illuminate at least one of the two radial halves 2c, 2d of the tyre 2 that is located on one side or the other with respect to the advancing direction X. Preferably, as shown in FIG. 4, the two slit lights 274, 275 are each adapted for illuminating one of the two radial halves 2c, 2d of the tyre 2 until at least the lower bead of the other radial half 2d, 2c is illuminated.

With reference to FIG. 3, in the checking units 19 and 23, the first checking station 27a, the second checking station 27b and the third checking station 27c comprise, as a whole, a set of image acquisition devices 282 that, as explained in detail hereinafter, is used by the checking line 18 to carry out the checks on the tyres 2 in order to verify the possible presence of defects.

The devices of the set of image acquisition devices 282 comprise high-resolution digital video cameras (not illustrated). The resolution of the aforementioned video cameras is preferably comprised between about 0.05 mm and about 0.1 mm. The video cameras are associated with respective light sources (not illustrated, preferably laser and/or LED) and optics (not illustrated) configured so as to illuminate the portions of the tyre 2 framed by the video cameras. The aforementioned devices are supported and moved by a certain number of anthropomorphous robotized arms. FIG. 3 schematically illustrates two anthropomorphous robotized arms (R1, R2) in the first checking station 27a, two (R3, R4) in the second checking station 27b and two (R5, R6) in the third checking station 27c. The video cameras of the set of image acquisition devices 282 can be digital matrix video cameras adapted for acquiring three-dimensional images and/or digital linear video cameras, adapted for acquiring two-dimensional images. Preferably, the digital linear video cameras are adapted for acquiring color images whereby they are linear video cameras with two lines of pixels. The three-dimensional or two-dimensional images are obtained thanks to the movement of the tyre 2 that rotates on the rotating table with respect to the three-dimensional/two-dimensional video cameras and to a suitable algorithm adapted for linking all of the images acquired along the circumference of the tyre.

The devices of the set of image acquisition devices 282 can also comprise mirrors (not illustrated) adapted for deviating the light emitted by the light sources and/or the light reflected by the surface of the tyre 2.

With reference to FIG. 3, the first checking unit 19 also comprises at least one barcode reader 284 that is arranged at the input post 27 and is configured to read a barcode identifying the tyres 2, arranged on each tyre 2.

At least one analogous barcode reader (not illustrated) can also be arranged at the outlet 25 of the second checking unit 23 for a further identifying check.

The checking line 18 is also equipped with an electronic unit 182 for managing the operation of the checking line 18. The electronic unit 182 comprises a processor 180 and a memory 184. The electronic unit 182 is operatively connected to the anthropomorphous robotized arms R1, R2, R3, R4, R5, R6 of the first checking unit 19 and of the second checking unit 23, to the preliminary image acquisition devices 280, to the devices of the set of image acquisition devices 282, to motors (not shown) that allow the rotation of the rotating tables of the checking stations 27a, 27b, 27c, to motors (not shown) that move the conveyor belts of the input post 27 and of the checking stations 27a, 27b, 27c, to motors (not shown) of the overturning and transporting device 22 and similar. Said electronic unit 182 can be the same electronic management unit of the entire plant 1 or can be operatively connected to other units dedicated to other parts of the plant 1.

In the memory 184 a plurality of tyre models are stored with which corresponding checking programs are associated, adapted for verifying the possible presence of defects in the tyres 2. In particular, each tyre model is associated with a respective setting for the set of image acquisition devices 282.

Preferably, for each model of tyre 2, said setting is suitably predetermined, for example in a previous setup step of the checking line 18, according to the specific profile of such a model of tyre 2, so as to take into account the specific geometric characteristics of the model of tyre 2, for example relative to sidewall roundness, sidewall height and similar. In this way, for each model of tyre, the setting is defined very accurately so as to ensure the acquisition of precise images, at high resolution and properly focused, at the same time preventing the devices of the set of image acquisition devices 282 from carrying out improper maneuvers that could damage them.

For each model of tyre 2, the setting defines a certain number of positions (for example four) for each device (in particular for each video camera moved by the respective robotized arm) of the set of image acquisition devices 282. Such positions allow the devices of the set of image acquisition devices 282 to acquire, as a whole, images of portions of interest of (preferably all of) the surface of the tyre 2. Each position is defined by a set of coordinates that identify the position in space of the device (for example of the barycenter of the video camera) relative to a reference system of the work stations 27a, 27b, 27c. For example, each position is defined by three Cartesian coordinates (x,y,z, for example respectively along the three axes X, Y and Z mentioned above) and three Euler angles ($\alpha$, $\beta$, $\gamma$).

As an example, FIG. 5 schematically shows, in a radial section plane, the positioning of the robotized arm R4, according to a position $P_1$ ($x_1$, $y_1$, $z_1$, $\alpha_1$, $\beta_1$, $\gamma_1$) of four positions $P_1$, $P_2$, $P_3$, $P_4$ (wholly not illustrated) that, as a whole, allow the respective video camera to acquire images of an inner side surface portion of the tyre 2 substantially corresponding to the portion of liner 5 opposite to the sidewall 11 and to the bead 7. In particular, in FIG. 5, the rectangles 410, 420, 430 and 440 graphically represent the area framed by the video camera in the four positions $P_1$, $P_2$, $P_3$, $P_4$. In particular, the height h of the rectangles 410, 420, 430 and 440 represents the depth of field of the video camera supported by the robotized arm R4 whereas the width L represents the width of the field of view of the video camera that it is considered suitable to use with respect to the theoretical field of view.

The four rectangles 410, 420, 430 and 440 are arranged so as to cover four surface sub-portions that, as a whole, make it possible to cover the entire portion of interest without discontinuity, the whole thing avoiding collisions of the video camera (including light source and optics) and of the respective robotized arm R4 against the tyre and/or other devices of the checking station. Preferably, in order to avoid such discontinuities, the rectangles 410, 420, 430 and 440 are in part juxtaposed over the adjacent rectangles.

In the memory 184, each model of tyre 2 is also associated with a respective reference profile 200 that is indicative of the profile of a tyre 2 belonging to such a model. Such a reference profile 200 can be suitably predetermined, for example in a prior step of setup of the checking line 18, making a tyre 2 belonging to such a model travel along the checking line 18 and obtaining such a reference profile 200 from a suitable processing of the images acquired by the set of image acquisition devices 282 during such travel. Preferably, the reference profile 200 comprises the three-dimensional outline (taken both circumferentially and radially) of the outer surface of at least one axial half 2a or 2b of tyre. FIG. 6 shows an example of the reference profile 200, for a radial half 2d of an axial half 2a, in a radial section plane that contains the rotation axis R of the tyre 2.

Preferably, for each model of tyre 2, the respective plurality of positions defined by the setting for the set of image acquisition devices 282 is adapted for allowing said set of image acquisition devices 282 to acquire images of the surface of the tyre in an accurate manner (in other words according to positions very close to such a surface) without interfering with the reference profile 200.

In accordance with the method for checking tyres according to the present invention, each time that a finished tyre 2 comes out from the molding and vulcanization line 14, it is transferred, for example through a conveyor, to the input post 27 of the first checking unit 19. The tyre 2 not mounted on a rim (thus deflated) is rested with a sidewall 11 on the support area of the support of the input post 27 with its second axial half 2b adjacent to such a support area and the first axial half 2a facing upwards.

In the input post 27 of the first checking unit 19, the barcode reader 284 reads the code displayed, for example, on the sidewall 11 of the tyre 2 facing upwards and the data contained in it are received by the processor 180. From such reading the processor 180 obtains the model associated with the tyre 2. According to a preferred embodiment of the invention, in the input post 27 of the first checking unit 19 (and, subsequently, in the input post 27 of the second checking unit 23), the processor 180 is adapted for implementing the algorithm illustrated in FIG. 10.

In particular, at block 101, the processor is adapted for acquiring (through the video cameras 270 and 272) preliminary images, at low resolution, of the outer surface of the first axial half 2a (or of the second axial half 2b) facing upwards of the tyre 2, while the tyre 2 advances along the advancing direction X. Such preliminary images are processed by the processor 180 (blocks 102-106 and 108-111) to carry out a preliminary check on predetermined geometric characteristics of the tyre 2. Such checking is adapted for highlighting possible macro-defects and for immediately recognizing possible deformed tyres to discard them immediately without proceeding further in the checking procedures (blocks 102-105). Moreover, such checking is adapted for detecting the aforementioned inevitable variations of the geometric characteristics of the tyres belonging to a same model and, possibly, to consequently intervene on the setting of the set of image acquisition devices 282 associated with such a model (blocks 106, 108-111).

Hereinafter, as an example, the level of the outer side surface of the tyre 2 being checked, hereinafter called "level of side surface" will be considered as geometric characteristic of the tyre 2. As schematically illustrated in FIG. 6, in a radial section plane YZ that contains the rotation axis R of the tyre 2, said level represents the distance d along the axis Y between the profile of the outer side surface of the tyre 2 and the axial middle plane M of the tyre 2. Such a level can be determined in the plane YZ at one or more points taken (along the radial direction Z of FIG. 6) on the reference profile 200 of the outer side surface of the tyre 2. In any case, the invention can also be applied in the case of other geometric magnitudes of the tyre.

In order to carry out the aforementioned preliminary check, at block 102, the processor 180 obtains, from a suitable processing of the preliminary images acquired by the video cameras 270 and 272, a three-dimensional profile 300 (taken both circumferentially and radially) of the outer surface of the tyre 2. Such a profile 300 is schematically illustrated in FIG. 7 for a radial half 2d of an axial half 2a of the tyre 2, in a radial section plane that contains the rotation axis R of the tyre 2.

From such a profile 300, at block 103, the processor 180 obtains a control value (not shown) relative to said level of side surface. For example, such a control value can be the maximum, minimum or average level of side surface, calculated on the profile 300, along the circumference of the tyre 2, at a predetermined radial coordinate Z or absolutely for any radial coordinate Z. The control value thus obtained is then compared with a first threshold (block 104) and a second threshold (block 106), less than the first threshold. The first and second threshold are suitably predetermined, for example from the reference profile 200, and stored in the memory 184 in association with the model of the tyre 2. In particular, the first threshold is preferably predetermined so as to make it possible to identify tyres 2 having a level of side surface that deviates greatly from that of the reference profile 200 (for example, by at least 1 cm), to such an extent as to consider the tyre 2 deformed. In turn, the second threshold is predetermined so as to make it possible to identify tyres 2 having a level of side surface almost equal to that of the reference profile 200 (for example, for variations below 1 mm), such as to consider as unnecessary possible interventions on the setting of the set of image acquisition devices 282 associated with the model of tyre 2.

Therefore, when the control value is greater than the first threshold, at block 105 the tyre 2 is identified as a deformed tyre and is discarded without proceeding further in the checking procedures. If such a condition occurs at the input post 27 of the first checking unit 19, the tyre 2 is discarded immediately at the inlet of the checking line 18. Otherwise, if such a condition occurs at the input post 27 of the second checking unit 23, the tyre 2 is discarded without proceeding further with the checks inside the latter checking unit 23.

When the control value is smaller than the second threshold, at block 107 the processor 180 provides for inspecting the tyre 2 to look for possible production defects according to the specific checking program associated with the model of tyre 2. In particular, the processor 180 provides for acquiring images of the surface of the tyre 2, using the set of image acquisition devices 282 set according to the setting associated with the model of tyre 2 (without carrying out any adjustment operation), and for analyzing the images acquired to look for possible production defects. When the control value is smaller than the second threshold at the input post 27 of the first checking unit 19, the tyre 2 is passed along such a first checking unit 19 where the first axial half 2a of the tyre 2 is inspected, then it is overturned by the overturning and transporting device 22, and then it is supplied to the input post 27 of the second checking unit 23, where the processor 180 will again carry out the algorithm of FIG. 10 operating on the second axial half 2b of the tyre 2. In turn, when the control value is less than the second threshold at the input post 27 of the second checking unit 23, the tyre 2 is passed along such a second checking unit 23 where the second axial half 2b of the tyre 2 is inspected. After this, the tyre comes out from the checking line 18.

When the control value is less than or equal to the first threshold and greater than or equal to the second threshold, at block 108, the processor 180 obtains, from the profile 300 previously obtained, adjustment values that are representative of the level of side surface of the tyre 2 at predetermined positions $P_i$ among those defined by the setting associated with the model of tyre 2. In particular, in the embodiment described, adapted for detecting variations of the level of side surface of the tyre 2, there are considered the positions defined by the aforementioned setting for the devices of the set of image acquisition devices 282 that are adapted for acquiring images of the outer and inner side surface of the tyre 2. For example, such adjustment values can be obtained from the profile 300 by calculating the weighted average, at 360° along the circumference of the tyre, of the level of side surface of the tyre 2 at the coordinate z of each aforementioned position $P_i$ (which defines a set of coordinates $x_i$, $y_i$, $z_i$, $\alpha_i$, $\beta_i$, $\gamma_i$). This is shown schematically in FIG. 7, where the adjustment values $v_1$, $v_2$, $v_3$, $v_4$ calculated at the four positions $P_1$, $P_2$, $P_3$, $P_4$ of the robotized arm R4 of FIG. 5 and, in particular, in the radial section plane YZ, at the coordinates $z_1$, $z_2$, $z_3$, $z_4$, respectively of the four positions $P_1$, $P_2$, $P_3$, $P_4$ are shown schematically.

Once the aforementioned adjustment values (e.g. $v_1$, $v_2$, $v_3$, $v_4$) have been obtained, at block 109, the processor 182 obtains in an analogous manner, from the reference profile 200, reference values (e.g. $v'_1$, $v'v_2$, $v'_3$, $v'_4$) of the level of side surface of the tyre 2 at the same positions (e.g. $P_1$, $P_2$, $P_3$, $P_4$) wherein the adjustment values (e.g. $v_1$, $v_2$, $v_3$, $v_4$) have been obtained. This is schematically illustrated in FIG. 8. Moreover, at block 110, the processor 180 compares the adjustment values with the respective reference values so as to calculate deviations (e.g. $\Delta y_1$, $\Delta y_2$, $\Delta y_3$, $\Delta y_4$) between the adjustment values and respective reference values, as schematically illustrated in FIG. 9.

Such deviations are then used at block 111 by the processor 180 to adjust the setting associated with the model of tyre 2. In particular, the processor 182 is adapted for modifying the coordinates of the positions defined by the setting of the set of image acquisition devices 282 based on such deviations. In the example of FIGS. 5-9, the processor 182 is, for example, adapted for modifying the coordinates of the positions $P_1$, $P_2$, $P_3$, $P_4$ by modifying the coordinate along the axis Y (representative of the variations of the level of side surface of the tyre 2) so as to obtain $P_1$ ($x_1$, $y_{1+}\Delta y_1$, $z_1$, $\alpha_1$, $\beta_1$, $\gamma_1$), $P_2$ ($x_2$, $y_{2+}\Delta y_2$, $z_2$, $\alpha_2$, $\beta_2$, $\gamma_2$), $P_3$ ($x_3$, $y_{3+}\Delta y_3$, $z_3$, $\alpha_3$, $\beta_3$, $\gamma_3$) and $P_4$ ($x_4$, $y_{4+}\Delta y_4$, $z_4$, $\alpha_4$, $\beta_4$, $\gamma_4$).

In general, in the case in which as well as the level of side surface (or as an alternative to it) variations (with respect to respective reference values) of other geometric magnitudes of the tyre are considered, the setting is adjusted (for the positions involving such variations) by modifying the spatial coordinates representative of such variations.

Preferably, the aforementioned processing at blocks 102-104, 106 and 108-110 and, in particular, the calculation of the deviations at block 110 are carried out by the processor in a reference system of the preliminary image acquisition devices 280 (in particular of the video cameras 270, 272). A suitable calibration procedure is therefore provided that makes it possible to characterize the geometry of the reference system of the video cameras 270, 272 and to map the coordinates identified in such a reference system in the set of coordinates (x, y, z, α, ρ, γ) of the reference system used in the work stations 27a, 27b, 27c. Once the setting associated with the model of tyre 2 has been adjusted, at block 112, the processor 180 inspects the tyre 2 to look for possible production defects according to the specific checking program associated with the model of tyre 2. In particular, the processor 180 provides for acquiring images of the surface of the tyre 2, using the set of image acquisition devices 282 set according to the setting adjusted at block 111, and for analyzing the images acquired to look for possible production defects. When the setting is adjusted at the input post 27 of the first checking unit 19, the tyre 2 is passed along such a first checking unit 19 where the first axial half 2a of the tyre 2 is inspected, then it is overturned by the overturning and transporting device 22, and then it is supplied to the input post 27 of the second checking unit 23 where the processor 180 again carries out the algorithm of FIG. 10 operating on the second axial half 2b of the tyre 2. In turn, when the setting is adjusted at the input post 27 of the second checking unit 23, the tyre 2 is passed along such a second checking unit 23 where the second axial half 2b of the tyre 2 is inspected. After this, the tyre comes out from the checking line 18.

During the inspections of blocks 107 and 112, in each of the checking stations 27a, 27b, 27c, a centering operation is firstly carried out, adapted for making the rotation axis R of the tyre 2 correspond with the vertical rotation axis Y of the rotating table. Subsequently, the robotized arms R1, R2, R3, R4, R5 and/or R6 of the checking station 27a, 27b or 27c are moved so as to position the set of image acquisition devices 282 in the positions defined by the setting associated with the model of tyre 2 (possibly adjusted at block 111). For each position defined by the setting, the robotized arms R1, R2, R3, R4, R5 and/or R6 are suitably positioned and, keeping the respective devices of the set of image acquisition devices 282 immobile, the tyre 2 is rotated by means of the rotating table about its rotation axis R with a predetermined peripheral speed until it is made to perform a rotation by a rotation angle of at least 360°.

During every rotation, different portions of the outer or inner surface of the tyre 2 are illuminated and slide in front of the video cameras that acquire the sequence of images received. During each rotation, which constitutes a checking cycle, the processor 180 carries out predetermined checking procedures, according to the specific checking program.

Once the last checking cycle has ended in the checking station 27a, 27b or 27c, the robotized arms R1, R2, R3, R4, R5, R6 are moved away from the tyre 2 and the tyre 2 is transferred to the next checking station 27b, 27c or to the overturning and transporting device 22 or to the outlet 25 of the checking line 18.

The aforementioned activities, adapted for inspecting as a whole (during a complete turn along the entire checking line 18) the tyre 2 to look for possible production defects, including the preliminary processing carried out at blocks 101-104 and 108-111 in the input posts 27, are substantially carried out in a checking cycle time Tcc that indicates (in normal operating conditions, in other words in the absence of discards of deformed tyres) the time that elapses between the outlet of a tyre 2 checked by the checking line 18 and the outlet of the next.

Preferably, the checking cycle time Tcc is equal to the production cycle time Tcp or to a multiple thereof. This makes it possible to carry out accurate checks of the tyres 2, taking into account the intrinsic variability of the geometric characteristics of the tyres 2 belonging to a same model, with times compatible with the production cycle time Tcp.

It should be observed that in an alternative embodiment (not illustrated), the comparison of the control value with the second threshold and the actions at blocks 106-107 can be omitted. In this case, in the case of a control value less than or equal to the first threshold, the processor 180 passes directly from block 104 to carrying out the actions at blocks 108-112. The setting is thus adjusted for all of the non-deformed tyres, also in the case of minimal deviations between the adjustment values and the respective reference values. It should be observed, moreover, that in a preferred embodiment (not illustrated), for each model of tyre, the processor 180 is adapted for obtaining a variation of the deviations (e.g. $\Delta y_1$, $\Delta y_2$, $\Delta y_3$, $\Delta y_4$) calculated at block 110 for the tyres 2 associated with the same model and, if the variation obtained satisfies predetermined conditions, for replacing in the memory 184 the setting associated with such a model with a setting adjusted based on the variation obtained. This can be useful in the case in which the setting associated by default with the model of tyre does not best match the geometric characteristics of such a model (for example because it is predetermined based on a tyre not adequately representative of the model).

The invention claimed is:

1. A method for checking a tyre for vehicle wheels, said tyre being associated with a model, the method comprising:
   a) obtaining the model associated with said tyre, the model being associated with a setting for positioning a set of image acquisition devices;
   b) acquiring preliminary images of said tyre;
   c) obtaining, from said acquired preliminary images, at least one adjustment value representative of at least one geometric characteristic of the tyre;
   d) calculating a deviation between said at least one adjustment value and a respective reference value, associated with said model;
   e) adjusting the setting associated with the model of the tyre based on the calculated deviation; and
   (f) inspecting said tyre to look for possible production defects by acquiring images of at least part of the surface of the tyre,
      wherein inspecting said tyre includes using the set of image acquisition devices set according to the setting thus adjusted for acquiring the images of at least part of the surface of the tyre.

2. The method according to claim 1, further comprising establishing whether said at least one geometric characteristic of the tyre is in compliance with reference specifications for said model.

3. The method according to claim 2, wherein c), d) and e) are carried out if said at least one geometric characteristic is in compliance with said reference specifications.

4. The method according to claim 3, wherein said reference specifications for said model comprise a first threshold and wherein the establishing whether said at least one geometric characteristic of the tyre is in compliance with said reference specifications comprises:
   obtaining from said acquired preliminary images a control value relative to said at least one geometric characteristic of the tyre,
   comparing said control value with said first threshold, and
   establishing compliance of said at least one geometric characteristic when said control value is less than or equal to said first threshold and the non-compliance when said control value is greater than said first threshold.

5. The method according to claim 3, wherein said reference specifications for said model comprise a first threshold and a second threshold, smaller than the first threshold, and wherein establishing whether said at least one geometric characteristic of the tyre is in compliance with said reference specifications comprises:
   obtaining from said acquired preliminary images a control value relative to said at least one geometric characteristic of the tyre,
   comparing said control value with said first threshold and said second threshold,
   establishing the compliance of said at least one geometric characteristic when said control value is less than or equal to said first threshold and greater than or equal to said second threshold, and
   establishing non-compliance of said at least one geometric characteristic when said control value is greater than said first threshold or less than said second threshold.

6. The method according to claim 5, wherein, when said control value is greater than said first threshold, the tyre is discarded without carrying out c), d) and e).

7. The method according to claim 6, wherein, when said control value is less than said second threshold, said tyre is inspected to look for possible production defects by acquiring images of at least part of the surface of the tyre, using the set of image acquisition devices set according to the setting associated with the model of the tyre, without carrying out c), d) and e).

8. The method according to claim 1, further comprising obtaining from said preliminary images a profile of a portion of the tyre and in c) obtaining said at least one adjustment value from said profile.

9. The method according to claim 7, further comprising obtaining from said preliminary images a profile of a portion of the tyre and obtaining said control value relative to said at least one geometric characteristic of the tyre from said profile.

10. The method according to claim 8, wherein said respective reference value corresponds to said adjustment value in a reference profile, associated with said model of the tyre, corresponding to the obtained profile.

11. The method according to claim 10, wherein said portion of the tyre from which the profile is obtained is an outer surface portion of the tyre.

12. The method according to claim 8, wherein said portion of the tyre from which the profile is obtained is at least one outer side surface portion of the tyre.

13. The method according to claim 1, wherein in b) said preliminary images are acquired at low resolution.

14. The method according to claim 1, wherein said setting comprises a plurality of positions for said set of image acquisition devices that allow said set of image acquisition devices to acquire said images of said at least part of the surface of the tyre.

15. The method according to claim 14, wherein in c) said at least one adjustment value is representative of said at least one geometric characteristic of the tyre at a respective position among said plurality of positions.

16. The method according to claim 15, wherein said respective position among said plurality of positions allows said acquisition of images relative to at least one from: at least one outer side surface portion of the tyre and at least one inner side surface portion of the tyre.

17. The method according to claim 1, wherein said at least one geometric characteristic of the tyre comprises at least one from: level of an outer side surface portion and level of an inner side surface portion of the tyre, wherein, in a radial section plane of the tyre that contains a rotation axis of the tyre, said level represents a distance, along a parallel to said rotation axis, between said outer or inner side surface portion and an axial middle plane of the tyre, perpendicular to the rotation axis of the tyre.

18. The method according to claim 1, wherein in b) said preliminary images are acquired through preliminary image acquisition devices arranged according to predetermined positions.

19. The method according to claim 18, wherein in b) the preliminary images of an outer surface portion of the tyre are acquired during a translation of the tyre, along an advancing direction, with respect to said preliminary image acquisition devices that remain stationary in the respective predetermined positions, said advancing direction being perpendicular to the rotation axis of the tyre.

20. The method according to claim 19, wherein said acquisition of preliminary images of the outer surface portion of the tyre comprises formation of two slit lights on a plane substantially perpendicular to said advancing direction, adapted to illuminate as a whole said outer surface portion of the tyre while the tyre translates along said advancing direction.

21. The method according to claim 1 further comprising obtaining a variation of the deviation calculated in d) for different tyres associated with said model.

22. The method according to claim 21, wherein, if the obtained variation satisfies predetermined conditions, the setting associated with the model of the tyre is replaced with a setting adjusted based on the variation obtained.

23. A checking line of a tyre for vehicle wheels, said tyre being associated with a model, the checking line comprising:
a plurality of checking stations comprising a set of image acquisition devices and preliminary image acquisition devices;
a memory comprising, in association with said model, a setting for positioning the set of image acquisition devices and at least one reference value for at least one geometric characteristic of the tyre; and
a processor configured to:
obtain, from preliminary images acquired by the preliminary image acquisition devices, at least one adjustment value representative of said at least one geometric characteristic of the tyre,
calculate a deviation between said at least one adjustment value and the respective reference value, associated with said model in said memory,
adjust the setting associated with the model of the tyre based on the calculated deviation, and
inspect said tyre to look for possible production defects acquiring images of at least part of the surface of the tyre,
wherein acquiring images of at least part of the surface of the tyre includes using the set of image acquisition devices set according to the setting thus adjusted so as to inspect said tyre to look for possible production defects.

24. The checking line according to claim 23, wherein the processor is further configured to:
obtain, from the preliminary images acquired by the preliminary image acquisition devices, a profile of a portion of the tyre, said at least one adjustment value being obtained from said profile.

25. The checking line according to claim 24, wherein said portion of the tyre from which the profile is obtained is an outer surface portion of the tyre and said preliminary image acquisition devices are configured to acquire preliminary images of said outer surface portion of the tyre while the tyre translates along an advancing direction, perpendicular to a rotation axis of the tyre.

26. The checking line according to claim 25, wherein said preliminary image acquisition devices are configured to form two slit lights on a plane substantially perpendicular to said advancing direction of the tyre, the two slit lights being adapted to illuminate as a whole said outer surface portion of the tyre while the tyre translates along said advancing direction.

27. The checking line according to claim 26, wherein the preliminary image acquisition devices are located at an input post of said plurality of checking stations that comprises a support for the tyre, said support comprising a conveyor belt adapted to convey the tyre along said advancing direction.

28. The checking line according to claim 27, wherein the preliminary image acquisition devices are located at an input post of said plurality of checking stations, said plurality of checking stations being adapted to be travelled in sequence by the tyre according to a checking path starting from the input post.

29. The checking line according to claim 28, wherein said preliminary image acquisition devices are supported by fixed support devices.

30. The checking line according to claim 29, wherein the devices of the set of image acquisition devices are operatively associated with respective support and movement devices comprising at least one robotized arm.

31. The checking line according to claim 30, wherein the preliminary image acquisition devices are adapted to acquire low-resolution images.

32. The checking line according to claim 31, wherein the devices of the set of image acquisition devices are adapted to acquire high-resolution images.

33. The checking line according to claim 23, wherein the processor is further configured to:
   calculate the deviation using spatial coordinates of the set of image acquisition devices, and
   adjust the setting by modifying spatial coordinates of the set of image acquisition devices.

34. The method according to claim 1, wherein:
   calculating the deviation uses spatial coordinates of the set of image acquisition devices, and
   adjusting the setting modifies spatial coordinates of the set of image acquisition devices.

35. A method for checking a tyre for vehicle wheels, said tyre being associated with a model with an associated setting for a set of image acquisition devices, the method comprising:
   a) obtaining the model associated with said tyre;
   b) acquiring preliminary images of said tyre;
   c) obtaining, from said acquired preliminary images, at least one adjustment value representative of at least one geometric characteristic of the tyre;
   d) calculating a deviation, using spatial coordinates of the set of image acquisition devices, between said at least one adjustment value and a respective reference value, associated with said model;
   e) adjusting the setting associated with the model of the tyre based on the calculated deviation, including modifying spatial coordinates of the set of image acquisition devices; and
   (f) inspecting said tyre to look for possible production defects by acquiring images of at least part of the surface of the tyre,
      wherein inspecting said tyre includes using the set of image acquisition devices set according to the setting thus adjusted for acquiring the images of at least part of the surface of the tyre.

* * * * *